United States Patent
Wiri et al.

(10) Patent No.: US 12,411,051 B2
(45) Date of Patent: Sep. 9, 2025

(54) BLAST EXPOSURE ASSESSMENT SYSTEM

(71) Applicant: Applied Research Associates, Inc., Albuquerque, NM (US)

(72) Inventors: Suthee Wiri, Albuquerque, NM (US); Charles E. Needham, Albuquerque, NM (US); David J. Ortley, Albuquerque, NM (US); Christina DeVito Wagner, Durham, NC (US); Tim Walilko, Raleigh, NC (US); Andrea A. Gonzales, Albuquerque, NM (US); Sara T. Wofford, Albuquerque, NM (US)

(73) Assignee: Applied Research Associates, Inc., Albuquerque, NM (US)

( * ) Notice: Subject to any disclaimer, the term of this patent is extended or adjusted under 35 U.S.C. 154(b) by 0 days.

(21) Appl. No.: 18/665,787

(22) Filed: May 16, 2024

(65) Prior Publication Data
US 2024/0302234 A1   Sep. 12, 2024

Related U.S. Application Data

(63) Continuation of application No. 17/683,808, filed on Mar. 1, 2022, now Pat. No. 12,007,295.

(51) Int. Cl.
*G01L 5/14* (2006.01)
(52) U.S. Cl.
CPC .................... *G01L 5/14* (2013.01)
(58) Field of Classification Search
CPC ......... G01L 5/14; G01N 33/227; G01N 3/313
See application file for complete search history.

(56) References Cited

U.S. PATENT DOCUMENTS

| | | |
|---|---|---|
| 6,178,141 B1 | 1/2001 | Duckworth et al. |
| 11,543,316 B2 | 1/2023 | Wiri et al. |
| 12,000,747 B2 | 6/2024 | Willens et al. |
| 2002/0003470 A1 | 1/2002 | Auerbach |
| 2010/0005571 A1 | 1/2010 | Moss et al. |
| 2012/0170412 A1 | 7/2012 | Calhoun et al. |
| 2015/0051847 A1 | 2/2015 | Angello et al. |
| 2015/0143875 A1 | 5/2015 | Wong et al. |
| 2016/0267763 A1 | 9/2016 | Allen et al. |

(Continued)

FOREIGN PATENT DOCUMENTS

| | | |
|---|---|---|
| CN | 111024011 A | 4/2020 |
| JP | 20200064883 | 4/2020 |

(Continued)

OTHER PUBLICATIONS

Przekwas, Andrzej, et al. "Fast-running tools for personalized monitoring of blast exposure in military training and operations." Military medicine 186.8upplement_1 (2021): 529-536.*

(Continued)

*Primary Examiner* — Herbert K Roberts
(74) *Attorney, Agent, or Firm* — Erise IP, P.A.

(57) ABSTRACT

A method, system, and computer-readable media for analyzing blast exposure data in which one or more spurious data features are identified, flagged, and removed from a set of pressure data received from a blast sensor. Pressure data sets are grouped based on waveform features to determine one or more incident overpressure parameters associated with a blast exposure event.

20 Claims, 7 Drawing Sheets

(56) References Cited

U.S. PATENT DOCUMENTS

| | | | |
|---|---|---|---|
| 2017/0196497 | A1 | 7/2017 | Ray et al. |
| 2017/0367627 | A1 | 12/2017 | Brister et al. |
| 2020/0265273 | A1 | 8/2020 | Wei et al. |
| 2022/0214124 | A1 | 7/2022 | Leonhardt et al. |
| 2022/0317145 | A1 | 10/2022 | Bartsch |
| 2023/0080071 | A1 | 3/2023 | Allen et al. |
| 2023/0144611 | A1 | 5/2023 | Wiri et al. |
| 2023/0408325 | A1 | 12/2023 | Wiri et al. |

FOREIGN PATENT DOCUMENTS

| | | | |
|---|---|---|---|
| KR | 1020110040648 A | | 4/2011 |
| WO | 2017011811 A1 | | 1/2017 |
| WO | 2018093444 A1 | | 5/2018 |

OTHER PUBLICATIONS

U.S. Appl. No. 17/826,631 Ex Parte Quayle Action issued Aug. 16, 2024.

European Patent Application 21890036.3, Extended Search Report, issued Sep. 9, 2024.

Peter Prince et al: "Deploying Acoustic Detection Algorithms on LowCost, Open-Source Acoustic Sensors for Environmental Monitoring", Sensors, vol. 19, No. 3, Jan. 29, 2019 (Jan. 29, 2019 ), p. 553, XP055685440, DOI: 10.3390/s19030553.

PCT Patent Application PCT/US2021/058000 International Preliminary Report on Patentability issued May 8, 2023.

PCT Patent Application PCT/US2023/014258 International Search Report and Written Opinion of the International Searching Authority issued Jun. 19, 2023.

PCT Patent Application PCT/US2023/023380 International Search Report and Written Opinion of the International Searching Authority issued Sep. 7, 2023.

U.S. Appl. No. 17/826,631 Non-Final Office Action issued Feb. 29, 2024.

U.S. Appl. No. 18/149,124 Non-Final Office Action issued Mar. 19, 2024.

U.S. Appl. No. 18/317,669 Non-Final Office Action issued Mar. 21, 2024.

PCT Patent Application PCT/US2024/27228 International Search Report and Written Opinion of the International Searching Authority issued Aug. 20, 2024.

U.S. Appl. No. 17/826,631 Notice of Allowance issued Oct. 8, 2024.

U.S. Appl. No. 18/149,124 Notice of Allowance issued Aug. 6, 2024.

U.S. Appl. No. 18/317,669 Notice of Allowance issued Aug. 7, 2024.

U.S. Appl. No. 18/944,513, Notice of Allowance issued Aug. 12, 2025.

* cited by examiner

BLAST EXPOSURE ASSESSMENT SYSTEM

RELATED APPLICATIONS

This patent application is a continuation application claiming priority benefit, with regard to all common subject matter, of U.S. patent application Ser. No. 17/683,808, filed Mar. 1, 2022, and entitled "BLAST EXPOSURE ASSESSMENT SYSTEM." This patent application shares certain subject matter in common with earlier-filed U.S. patent application Ser. No. 17/093,107, filed Nov. 9, 2020, and entitled "IDENTIFYING FALSE POSITIVE DATA WITHIN A SET OF BLAST EXPOSURE DATA," now U.S. Pat. No. 11,543,316. The earlier-filed application and patent are hereby incorporated by reference in their entirety into the present application.

BACKGROUND

1. Field

Embodiments of the invention relate to blast exposure analysis. More specifically, embodiments of the invention relate to analyzing blast exposure data to determine blast exposure parameters.

2. Related Art

Body-mounted blast sensors are used to record pressure data relating to a blast exposure event experienced by a subject. However, said blast sensors are not capable of measuring certain blast exposure parameters directly such as incident overpressure. Further, in cases in which multiple body-mounted blast sensors are used, it becomes difficult to synchronize data from each blast sensor due to varying clock drift within the sensors.

Typically, blast data analysis is performed by hand from a trained professional, such as a blast engineer or blast expert, who looks over the blast exposure data and identifies and removes false positive data before correlating readings to determine blast exposure. This process is cumbersome and time-consuming and relies on a relatively small group of trained professionals. Accordingly, manual techniques of analyzing blast exposure data are not scalable to a large volume of blast data records potentially containing data relating to millions blast exposure instances. Therefore, what is needed is an automated approach to analyze a plurality of sets of blast exposure data.

SUMMARY

Embodiments of the invention solve the above-mentioned problems by providing a method, system, and computer-readable media for analyzing blast exposure data in which one or more spurious data features are identified, flagged, and removed from a set of pressure data and data sets are grouped based on waveform features to determine an estimated incident overpressure associated with a blast event.

A first embodiment of the invention is directed to a method for analyzing blast exposure data, the method comprising receiving a plurality of sets of raw pressure data, each set of raw pressure data of the plurality of sets of raw pressure data collected by a respective blast sensor of a plurality of blast sensors, for each set of raw pressure data of the plurality of sets of raw pressure data applying one or more filters and a baseline shift to the set of raw pressure data to generate a set of filtered data, the baseline shift removing a bias from the set of raw pressure data, identifying one or more spurious features within the set of filtered data, responsive to identifying the one or more spurious features, flagging one or more portions of the set of filtered data that include the one or more spurious features, removing the one or more flagged portions of the set of filtered data, automatically identifying one or more waveform features within the set of filtered data, grouping two or more sets of filtered data from respective sets of raw pressure data of the plurality of sets of raw pressure data into a blast event data grouping based at least in part on the one or more identified waveform features, and estimating an incident blast overpressure based on the two or more sets of filtered data within the blast event data grouping.

A second embodiment of the invention is directed to a system for analyzing blast exposure data, the system comprising a data store, and at least one processor programmed to perform a blast exposure analysis method, the method comprising receiving a plurality of sets of raw pressure data, each set of raw pressure data of the plurality of sets of raw pressure data collected by a respective blast sensor of a plurality of blast sensors, for each set of raw pressure data of the plurality of sets of raw pressure data applying one or more filters and a baseline shift to the set of raw pressure data to generate a set of filtered data, the baseline shift removing a bias from the set of raw pressure data, identifying one or more spurious features within the set of filtered data, responsive to identifying the one or more spurious features, flagging one or more portions of the set of filtered data that include the one or more spurious features, removing the one or more flagged portions of the set of filtered data, automatically identifying one or more waveform features within the set of filtered data, grouping two or more sets of filtered data from respective sets of raw pressure data of the plurality of sets of raw pressure data into a blast event data grouping based at least in part on the one or more identified waveform features, estimating an incident blast overpressure based on the two or more sets of filtered data within the blast event data grouping, and storing one or more files comprising the estimated incident blast overpressure within the data store.

A third embodiment of the invention is directed to one or more non-transitory computer-readable media storing computer-executable instructions that, when executed by at least one processor, perform a method for analyzing blast exposure data, the method comprising receiving a plurality of sets of raw pressure data, each set of raw pressure data of the plurality of sets of raw pressure data collected by a respective blast sensor of a plurality of blast sensors, for each set of raw pressure data of the plurality of sets of raw pressure data applying one or more filters and a baseline shift to the set of raw pressure data to generate a set of filtered data, the baseline shift removing a bias from the set of raw pressure data, identifying one or more spurious features within the set of filtered data, responsive to identifying the one or more spurious features, flagging one or more portions of the set of filtered data that include the one or more spurious features, removing the one or more flagged portions of the set of filtered data, automatically identifying one or more waveform features within the set of filtered data, grouping two or more sets of filtered data from respective sets of raw pressure data of the plurality of sets of raw pressure data into a blast event data grouping based at least in part on the one or more identified waveform features, and estimating an incident blast overpressure based on the two or more sets of filtered data within the blast event data grouping.

Additional embodiments of the invention are directed to systems, methods, and computer-readable media of analyzing blast exposure data and generating a blast exposure report for monitoring blast exposure of a plurality of individuals.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
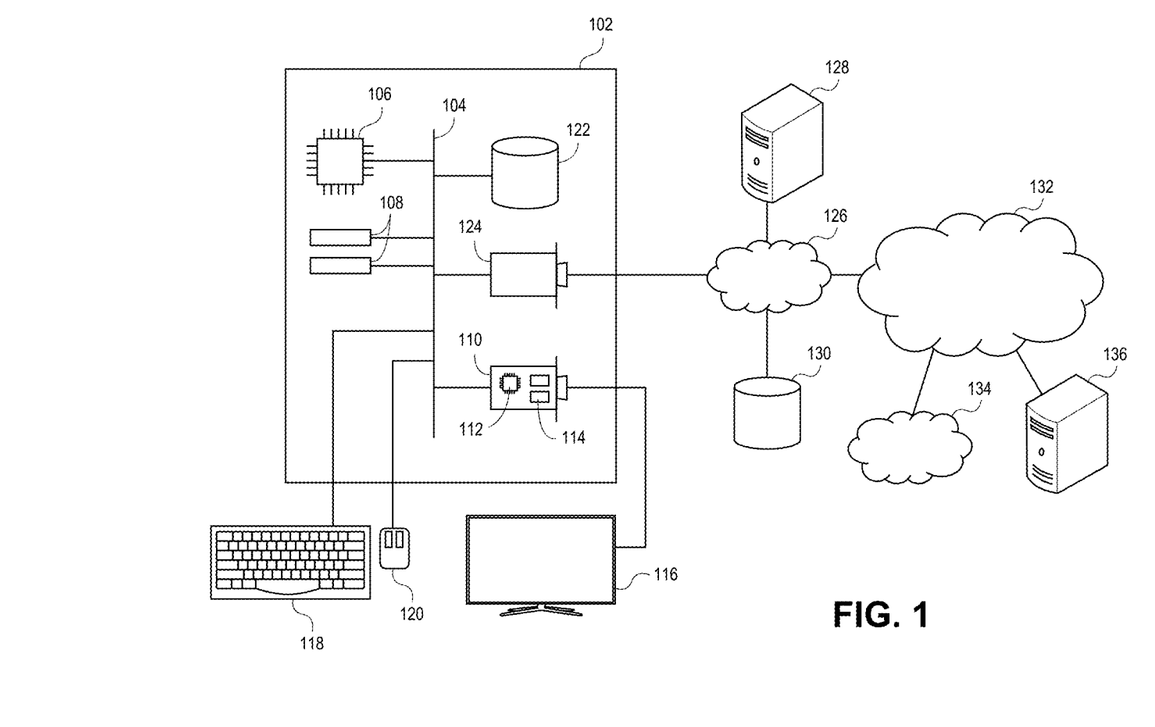
FIG. 1 depicts an exemplary hardware platform relating to some embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, BLUETOOTH, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
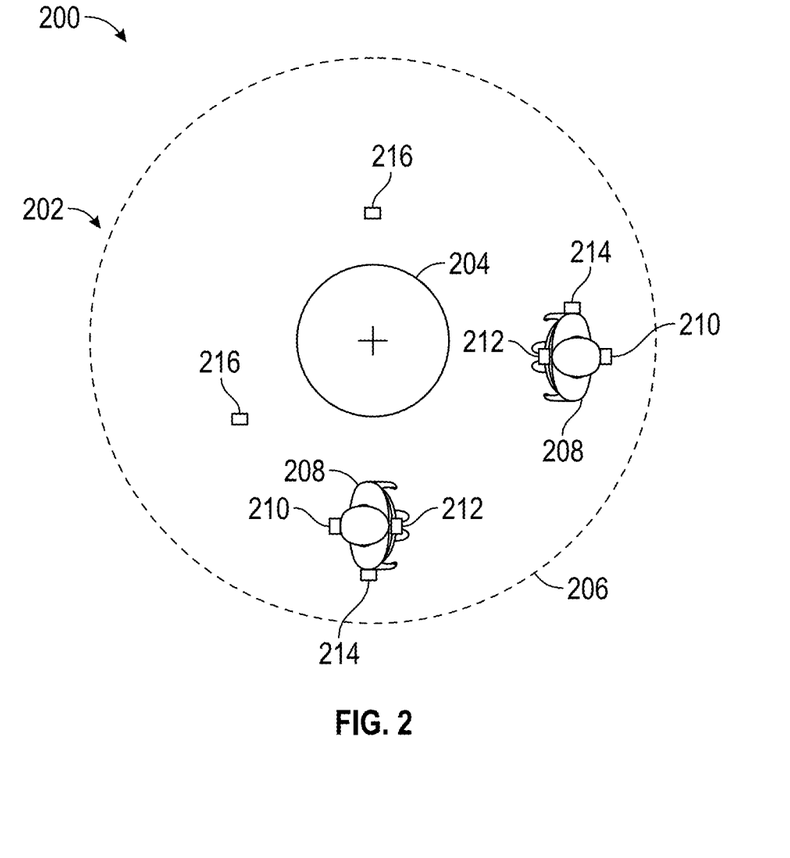
FIG. 2 depicts an exemplary blast exposure diagram relating to some embodiments of the invention.

Turning now to FIG. 2, a blast exposure diagram of an exemplary blast environment 200 is depicted, relating to some embodiments of the invention. In the depicted scenario, the blast environment 200 includes a blast 202 including a blast epicenter 204 and a blast wave 206 extending radially outward from the blast epicenter 204. In some embodiments, the blast epicenter 204 may be produced from any pressure-wave-generation source such as, for example, firing of a weapon or detonation of an explosive material. Broadly speaking, any detonation or deflagration event may be evaluated by embodiments of the invention. As shown, the blast wave 206 covers a greater radius than the blast epicenter 204 itself. In some embodiments, one or more subjects 208 may be in proximity to the blast 202, as shown. In some embodiments, each of the subjects 208 may be a user or operator of a source of blast 202 or may simply be present when blast 202 occurs or is triggered. For example, in some embodiments, the subjects 208 are military personnel or law enforcement officers present when blast 202 occurs.

In some embodiments, each of the subjects 208 has body-mounted sensors such including some or all of a head-mounted sensor 210 disposed on a back-side of a helmet of the subject 208, a chest-mounted sensor 212 disposed on a chest of the subject 208, and a shoulder-mounted sensor 214 disposed on a dominant shoulder of the subject 208. Alternatively, in some embodiments, the shoulder-mounted sensor 214 may be disposed on the right shoulder of the subject regardless of which shoulder is dominant. In some embodiments, each subject 208 may have three sensors. However, embodiments are contemplated in which any number of sensors may be included. For example, four sensors may be included with a sensor disposed on each shoulder.

In some embodiments, each of the head-mounted sensor 210, the chest-mounted sensor 212, and the shoulder-mounted sensor 214 may be a pressure sensor configured to measure and record a blast pressure over time. For example, in some embodiments, each sensor comprises a pressure sensing transducer such as, for example, a piezoelectric/resistive pressure sensor, a variable capacitance pressure sensor, a strain-gauge, or a solid-state pressure switch. However, embodiments are contemplated in which other types of suitable pressure sensing transducer not explicitly described herein are included.

In some embodiments, one or more static sensors 216 may be included within the blast environment 200, as shown. In some embodiments, each of the static sensors 216 may comprise a stake structure which is configured to be staked into the ground. Alternatively, in some embodiments, the static sensors 216 may be mounted to other suitable static structures such as walls or other static objects in the blast environment 200. In some embodiments, the static sensors 216 comprise a similar pressure sensing transducer as described above with respect to the body mounted sensors 210, 212, and 214.

In some embodiments, each of the body mounted sensors 210, 212, and 214 may be triggered to record data whenever a pressure is measured which exceeds a predefined trigger level. For example, in some embodiments, each of the blast sensors may be triggered to record data when the respective blast sensor measures a pressure greater than about 0.5 pounds per square inch (psi). However, embodiments are contemplated in which the predefined trigger level may be set to other pressure values such as 0.25 psi, 1.0 psi, or 1.5 psi. Further, in some embodiments, the predefined trigger level may be set and changed by an operator. In some embodiments, each of the blast sensors may record continuously (for example into a circular buffer) and begin persisting new data as well as the data from the circular buffer to longer-term storage when a blast is detected, so as to capture pressure data prior to the blast event.

As described above, the explosion 202 may be caused by any of a variety of blast sources. For example, in some embodiments, the explosion 202 comprises firing of an artillery weapon during either an active-duty operation or a training operation. Alternatively, the explosion 202 may be associated with use of a firearm such as firing of a .50 caliber weapon or with the detonation of an explosive charge or breaching device. Accordingly, each explosive device may produce a blast wave of varying size and magnitude with a unique blast signature.

Data from the blast wave 206 may be captured by all or a portion of the sensors described above for each subject 208. For example, data for the blast wave 206 may be recorded by the chest-mounted sensor 212 and the shoulder-mounted sensor 214 but not by the head-mounted sensor 210. However, readings from multiple measurement sources must be temporally correlated prior to analysis. Accordingly, in some embodiments, various techniques may be used to synchronize and correlate the data between the sensors. In some embodiments, each sensor may include an internal clock or timer such that each recorded pressure value may be associated with a time value or time stamp. However, clock drift and/or skew between the internal clock associated with the different sensors may cause inaccuracy within the time values. Accordingly, time shifts may be applied to correct said clock drift, as will be described in further detail below.

Figure 3:
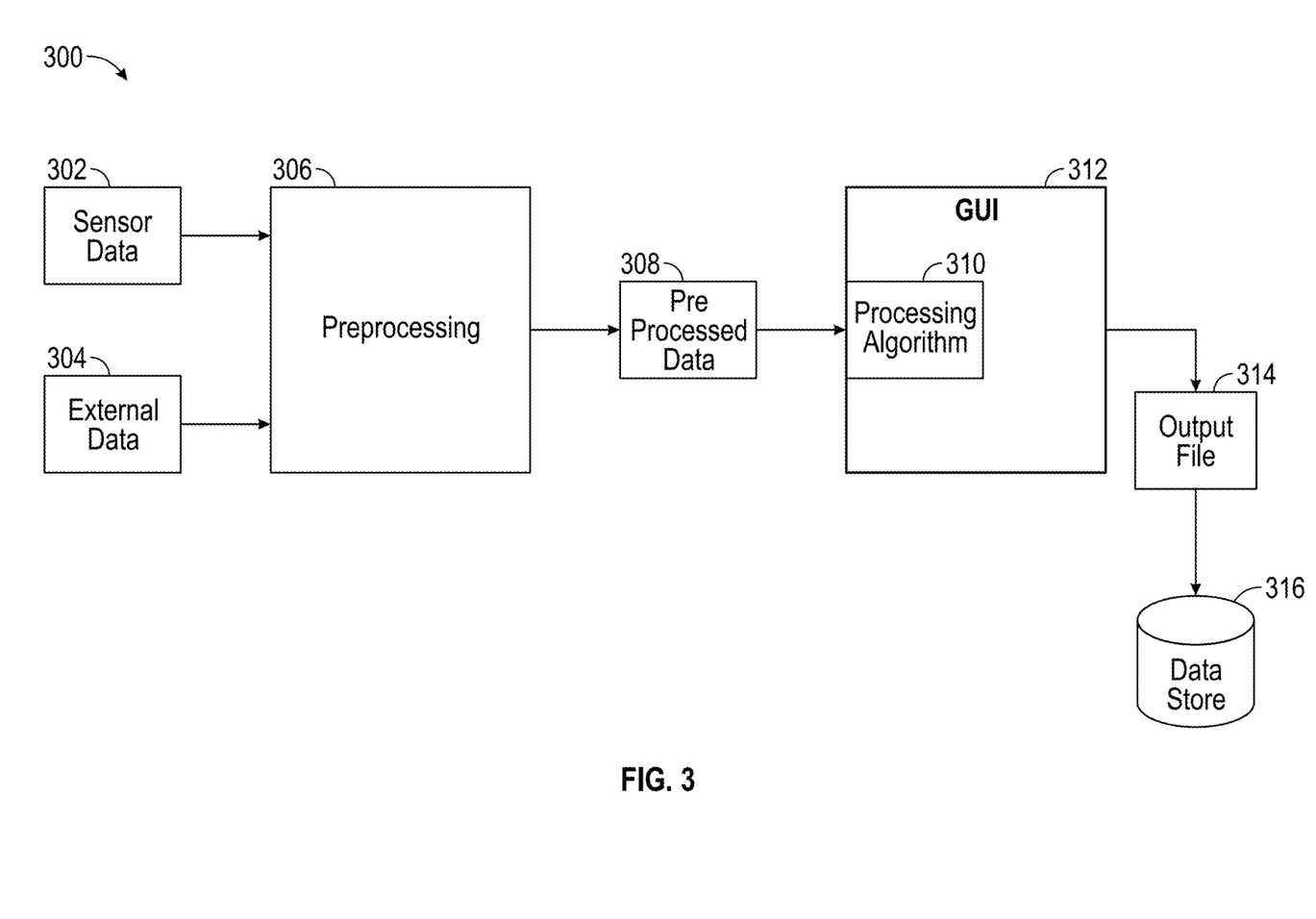
FIG. 3 depicts an exemplary system diagram of a system for processing blast exposure data relating to some embodiments of the invention.

Turning now to FIG. 3, an exemplary system diagram of a system 300 for processing blast exposure data relating to some embodiments of the invention. In some embodiments, a set of sensor data 302 and external data 304 are received into a preprocessing stage 306, as shown. However, in some embodiments, the sensor data 302 may be received without the external data 304. Alternatively, embodiments are contemplated in which the sensor data 302 may be included within the external data 304. In some embodiments, the sensor data 302 may be received remotely over a wireless connection such as an internet connection or directly using one or more removable storage devices such as flash memory devices installed in the sensor devices. Further, in some embodiments, the sensor data 302 may be received into an on-board processing system included within the sensor device. In some embodiments, the external data 304 comprises any combination of metadata, vendor data relating to a vendor or owner of the sensor data 302, or additional data for processing the sensor data 302.

In some embodiments, the sensor data 302 comprises one or more input traces, as will be described in further detail below. Embodiments are contemplated in which the sensor data 302 may be processed in real-time as the sensor data 302 is collected. Alternatively, in some embodiments, the sensor data 302 may be stored and processed after the sensor data 302 is collected. In some embodiments, any combination of real-time and post-collection processing are contemplated. For example, a first portion of the sensor data 302 may be processed in real-time as the sensor data 302 is collected while a second portion of the sensor data 302 is stored and processed at a later time.

In some embodiments, the preprocessing stage 306 of the processing system 300 converts the received sensor data 302 and external data 304 into a consistent form which can be processed by the system 300. For example, in some embodiments, the sensor data 302 is received as raw pressure over time data in a variety of different file types depending on which vendor provides the sensor data. Accordingly, each set of sensor data 302 is converted into the consistent form such that the different sets of sensor data 302 may be processed uniformly by the system 300. After the sensor data 302 is preprocessed and converted at the preprocessing stage 306 a set of preprocessed data 308 is generated and transmitted to a processing algorithm 310. In some embodiments, the processing algorithm 310 may be included within a graphical user interface 312, as shown. However, embodiments are contemplated in which the processing algorithm 310 may be included individually separate from the graphical user interface 312.

In some embodiments, the processing algorithm 310 generates one or more output files 314 based on the received preprocessed data 308. In some such embodiments, each output file 314 comprises processed data indicative of various aspects of the received sensor data 302. In some embodiments, the data within the output file 314 is further refined by the processing algorithm 310. For example, in some embodiments, one or more spurious data components which are present within the raw sensor data may be removed from the output file 314. Further, in some embodiments, the one or more output files 314 may be stored within a data store 316. In some embodiments, the data store 316 may be a remote data store in a different physical location from other components of the system 300. Further still, embodiments are contemplated in which the one or more output files 314 may be stored across a plurality of data stores.

Figure 4:
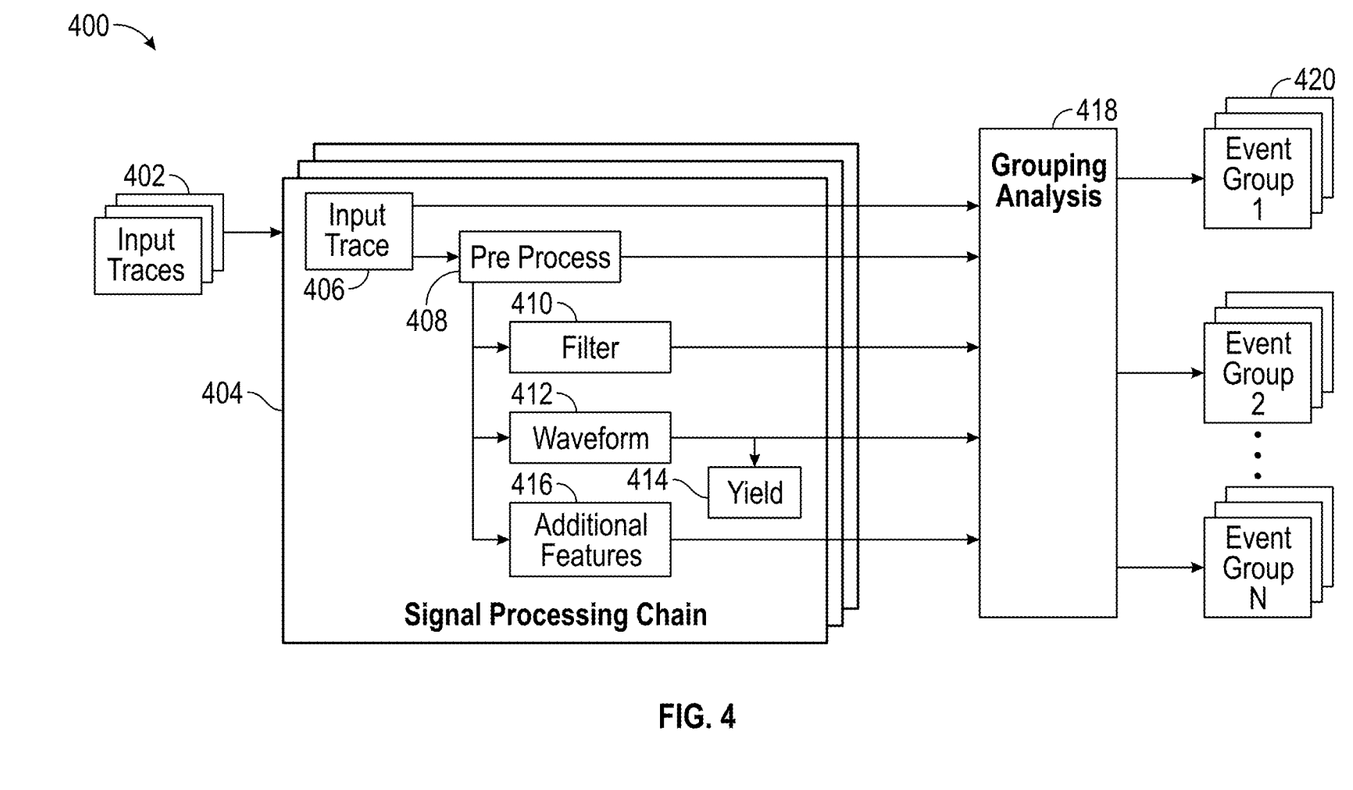
FIG. 4 depicts an exemplary process flow diagram of process for analyzing blast exposure data relating to some embodiments of the invention.

Turning now to FIG. 4, an exemplary process flow diagram of a process 400 for analyzing blast exposure data is depicted relating to some embodiments of the invention. In some such embodiments, one or more input traces 402 are received into a series of signal processing chains 404. In some embodiments, a single input trace 406 is received into each signal processing chain 404, as shown. In some embodiments, the input trace 406 includes a set of associated metadata relating to the sensor data 302. In some embodiments, the metadata may include any combination of a user identifier of the user associated with the blast sensor, one or more timestamps, and other sensor related or vendor specific information. In some embodiments, the signal processing chain 404 includes a preprocessing stage 408 for preprocessing and/or converting the input trace 406. In some embodiments, the preprocessing stage 408 applies a baseline shift to the input trace 406 to reduce a bias (such as, for example, a DC bias) of the input trace 406.

In some embodiments, a filtering stage 410 may be included within the signal processing chain 404, as shown, for applying one or more data filters to the input trace 406. In some embodiments, the filtering stage 410 may be included downstream of the preprocessing stage 408, as shown, such that the filters are applied to the preprocessed data. In some embodiments, the one or more filters includes a spurious data filter for removing false positive data from the input trace 406. Suitable techniques for removing false positive data are described in earlier-filed U.S. patent application Ser. No. 17/093,107 filed Nov. 9, 2020, and entitled "IDENTIFYING FALSE POSITIVE DATA WITHIN A SET OF BLAST EXPOSURE DATA," now U.S. Pat. No. 11,543,316, which is hereby incorporated by reference in its entirety. In some embodiments, a waveform stage 412 is included within the signal processing chain 404, as shown, for applying a waveform fit to the input trace 406. In some embodiments, the waveform stage 412 fits a Friedlander waveform function to the preprocessed data. In some embodiments, one or more yield fits 414 may be generated based on the fit waveform function from the waveform stage 412. In some embodiments, one or more additional features 416 may be included within the signal processing chain 404, as shown. In some embodiments, the additional features 416 may comprise any number of additional filters and transformations to the preprocessed data or raw sensor data.

In some embodiments, a variety of additional information may be generated and identified within the signal processing chain 404 based on the received input trace 406. For example, in some embodiments, a Savitzky-Golay convolution may be applied to the input trace 406 using low-order polynomial fits. Further, in some embodiments, data within the input trace 406 may be integrated or differentiated and one or more maxima and/or minima may be identified within the data. Additionally, data features such as step functions, spikes, oscillations, square waves, and slopes may be identified within the input trace 406.

In some embodiments, data from the signal processing chain 404 may be transmitted to a grouping analysis stage 418. For example, in some embodiments, the grouping analysis stage 418 receives any combination of metadata from the input trace 406, baseline shifted data from the preprocessing stage 408, filtered data from the filtering stage 410, waveform data from the waveform stage 412, yield data corresponding to the yield fits 414, additional data from the one or more additional features 416. In some embodiments, the grouping analysis stage 418 groups portions of data from each input trace 406 into a plurality of respective event groups 420. For example, input traces 402 may record data from a plurality of sensors corresponding to a plurality of blast events, where reading from each individual blast event should be correlated together and analyzed individually. This may be done, for example, based on one or more data features that are identified within the received data. Accordingly, the portions of data may be grouped with other sets of data based on the identified data features within each input trace 406. In some embodiments, the portions of data may be grouped based further on metadata or other data associated with each input trace 406. For example, in some embodiments, data may be grouped based on time data within the received metadata for each input trace 406.

Figure 5:
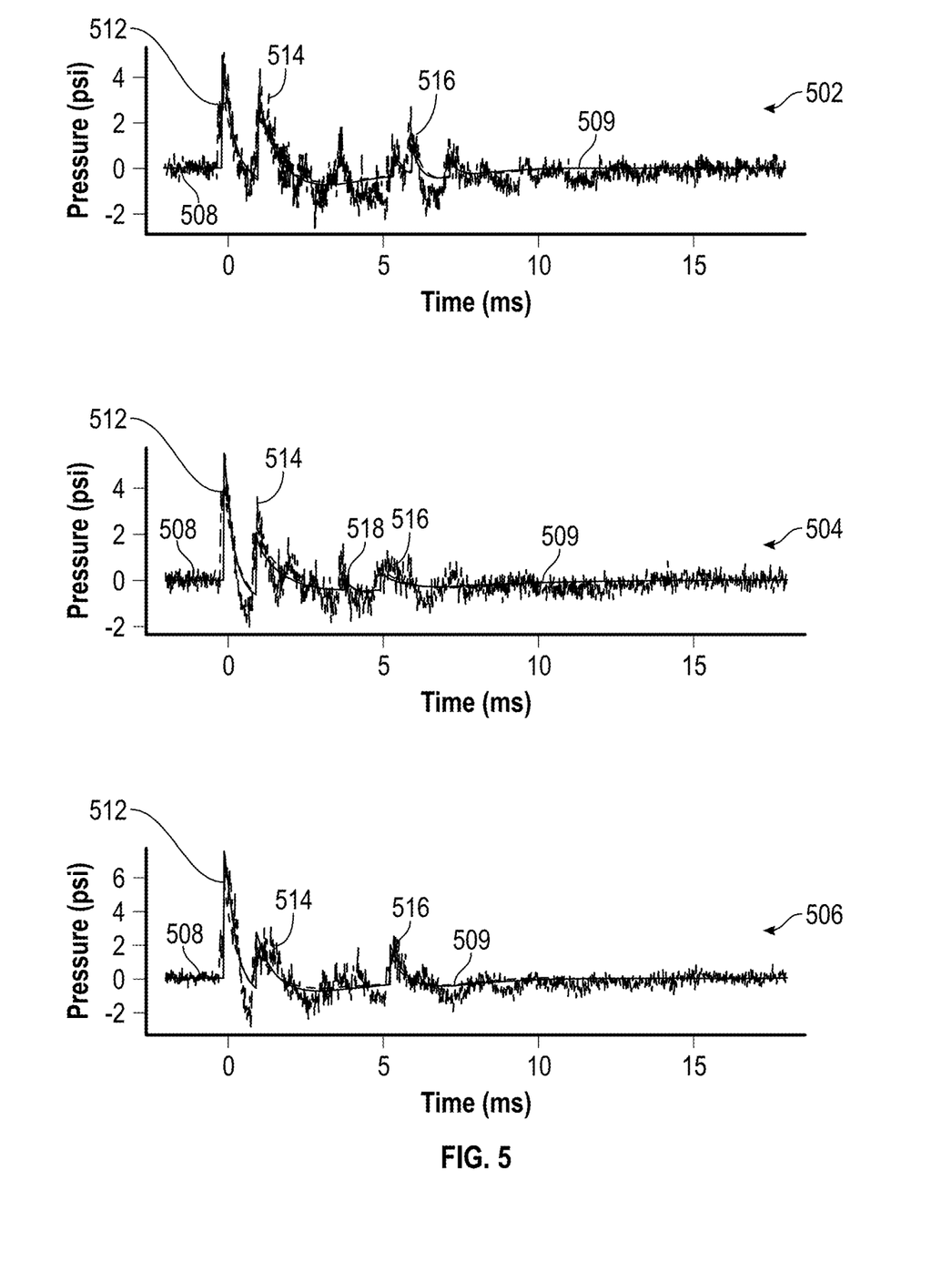
FIG. 5 depicts an exemplary set of grouped pressure-time graphs relating to some embodiments of the invention.

Turning now to FIG. 5, a set of exemplary grouped pressure-time graphs referred to generally by reference numeral 500 is depicted relating to some embodiments of the invention. The set of pressure-time graphs includes a first pressure-time graph 502 relating to blast exposure data collected by the head-mounted sensor 210, a second pressure-time graph 504 relating to blast exposure data collected by the chest-mounted sensor 212, and a third pressure-time graph 506 relating to blast exposure data collected by the shoulder-mounted sensor 214. In some embodiments, the data included on the set of pressure-time graphs corresponds to a single user.

Each of the pressure-time graphs 502, 504, and 506 include a vertical axis indicating pressure in pounds per square inch (psi) and a horizontal axis indicating time in milliseconds (ms). However, embodiments are contemplated in which any suitable units may be used within the received input trace. For example, pressure may be indicated using Pascals (Pa) and time may be given in seconds (s). In some embodiments, each of the pressure-time graphs 502, 504, and 506 include a set of raw pressure data 508 and at least one waveform fit 509, as shown. In some embodiments, the raw pressure data 508 comprises pressure over time data as it was received from the respective blast sensor. As depicted, the raw sensor data may be noisy, such that it is desirable to fit one or more waveforms (for example, a series of additively combined Friedlander waveforms) to the raw data. Alternatively or in addition, in some embodiments, the raw pressure data 508 may be shifted, filtered, or corrected in some way prior to fitting the waveforms. In some embodiments, the waveform fit 509 may be determined based on the raw pressure data 508, however, the waveform fit 509 may include various filters and data smoothing techniques to reduce noise which is present in the raw pressure data 508.

Each of the pressure-time graphs 502, 504, and 506 includes one or more pressure peaks, as shown. The first pressure-time graph 502 corresponding to an input trace collected by the head-mounted sensor 210 includes a first peak 512, a second peak 514, and a third peak 516 identified within the pressure-time data. In some embodiments, each peak may be characterized by identifying a sharp rise to a peak pressure value followed by a relatively gradual decay back to a zero value. However, in some embodiments, a subsequent peak may occur before the pressure from a preceding peak has returned to zero.

In some embodiments, a different number of peaks may be included on each graph even though the graphs relate to the same blast event. For example, the second pressure-time graph 504 may include an additional peak 518, as shown, which does not appear on the other graphs. Further, in some embodiments, the times of each of the peaks may vary between each pressure-time graph. For example, in some embodiments, clock drift within each sensor may desynchronize the timing within the respective input traces, as will be described in further detail below.

In some embodiments, one or more timestamps may be included within metadata of the sensor data 302. In some such embodiments, the timestamps may be generated based on an internal clock of each respective sensor. Accordingly, in some embodiments, clock drift and/or skew may become a source of inaccuracy for the timestamps. Accordingly, in some embodiments, time shifts may be applied to one or more of the input traces to synchronize the times within the respective grouping of input traces and correct clock drift. In some such embodiments, the time shifts may be determined based at least in part on the data features within each input trace.

In some cases, a single blast event may induce multiple pressure peaks. For example, even a single blast source may induce a primary pressure peak from the primary pressure wave and one or more reflected peaks from a corresponding one or more reflected pressure waves. Accordingly, a max pressure may be determined over each of the peaks. In one example, three peaks may be included within the pressure data. Here, the max pressure may be determined over all three peaks and the impulses may be summed for the three peaks to determine a total impulse. However, it should be understood that the blast exposure analysis as described herein may be applied to pressure data including any number of peaks.

In some cases, only a portion of the blast sensors are triggered to record data for an exemplary blast event. For example, the exemplary blast event may only trigger the head-mounted sensor 210 without triggering the chest-mounted sensor 212 or the shoulder-mounted sensor 214. In some embodiments, analysis techniques may still be able to group the data from the sensors even if only a single sensor is triggered. Similarly, the sensor data may be grouped if two out of the three body-mounted sensors are triggered, or any other number of sensors are triggered out of the total number of sensors. In some embodiments, if any of the body-mounted sensors are triggered the other sensors will automatically be triggered. For example, in some embodiments, if the head-mounted sensor 210 is triggered a signal may be transmitted to each of the chest-mounted sensor 212 and the shoulder-mounted sensor 214 based on the trigger. Said signal may trigger each of the chest-mounted sensor 212 and the shoulder-mounted sensor 214 to record pressure data. Further, embodiments are contemplated in which a trigger identifier may be recorded which uniquely identifies the trigger. Accordingly, the trigger identifier may be used during the grouping analysis stage 418 to group the sets of sensor data. In some such embodiments, each of the blast sensors may be communicatively coupled. Alternatively, in some embodiments, a controller, microcontroller, processor, or microprocessor may be communicatively coupled to at least one of the blast sensors, which transmits and receives signals from the blast sensors.

In some embodiments, one or more incident parameters including an incident overpressure, peak incident overpressure, or incident impulse may be determined based on data from a grouping of sensor data. In some embodiments, it should be understood that incident overpressure may refer to an incident pressure, "side-on" pressure, or free-field pressure. In some embodiments, the incident parameters may be independent from the factors such as the orientation of the blast sensors. Accordingly, it may be desirable to consider the incident parameters for determining and monitoring injuries and health effects from a blast wave. However, the blast sensors including the head-mounted sensor 210, the chest-mounted sensor 212, and the shoulder-mounted sensor 214 may not be capable of measuring said incident parameters directly. Accordingly, data from two or more blast sensors may be grouped together to estimate the incident parameters. For example, where a plurality of subjects are present in the same blast area, one subject may shield a second subject, who may in turn shield a third subject. Where this blast exposure is analyzed collectively, the shielding effects of the first user may be removed prior to analyzing the blast exposure data for the second user, effectively simulating what the second user would experience if the first user were removed from the blast area and replaced with a non-shield blast probe. Similarly, the shielding effects of the secondary user may be removed prior to analyzing the blast exposure data for the third user, and so on.

Figure 6:
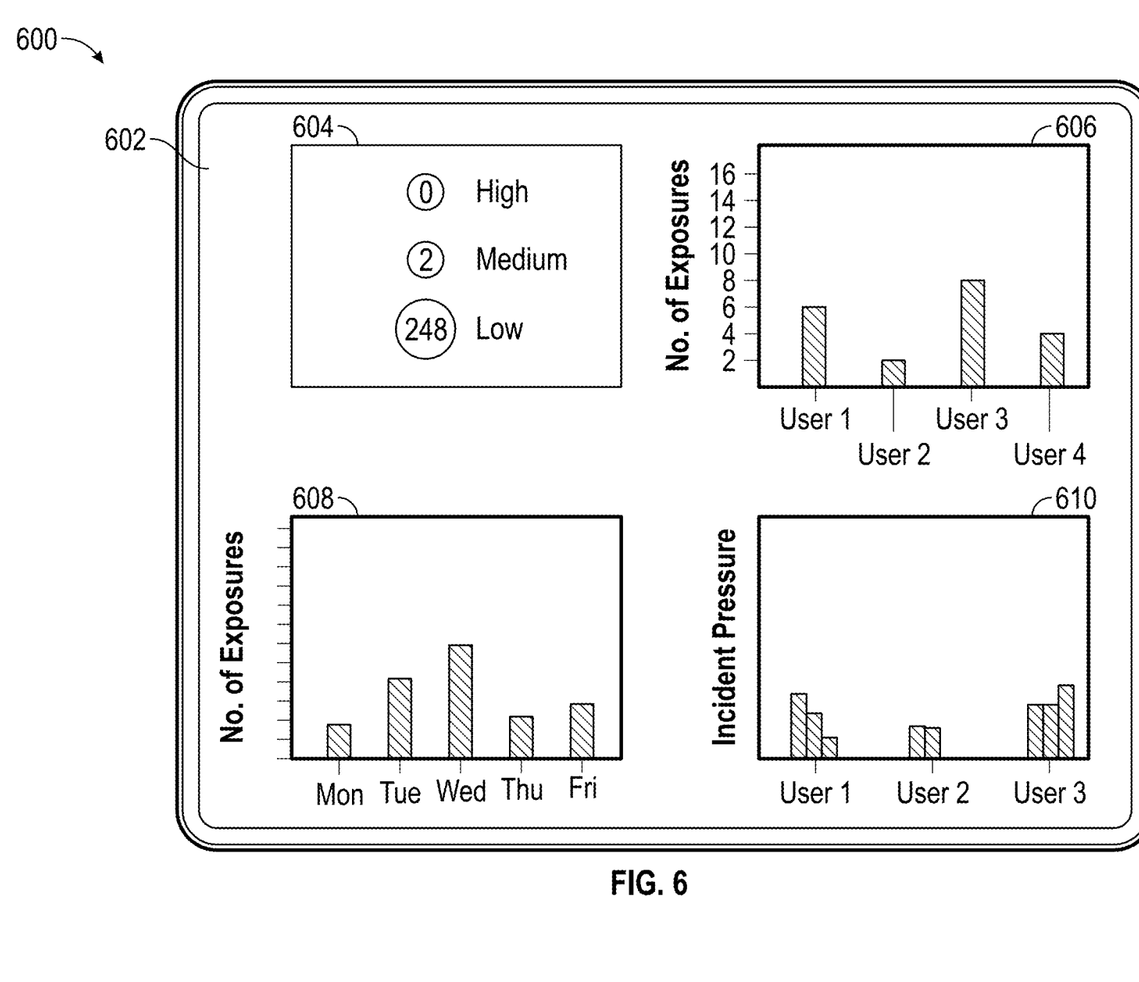
FIG. 6 depicts an exemplary graphical user interface of a blast exposure report relating to some embodiments of the invention.

Turning now to FIG. 6, an exemplary graphical user interface 600 is depicted relating to some embodiments of the invention. In some embodiments, the graphical user interface 600 is the same as the graphical user interface 312, as shown in FIG. 3. In some embodiments, the graphical user interface 600 may be displayed on a display of a user device such as a laptop screen, desktop screen, or a screen of a mobile device. In some embodiments, a blast exposure report 602 may be generated and displayed within the graphical user interface 600, as shown. In some such embodiments, the blast exposure report 602 comprises a number of graphs and indicators including information relating to the received pressure data and the determined incident overpressure parameters. In some embodiments, the blast exposure report 602 comprises an exposure level table 604 including indicators which show the number of blast exposures within a set of predetermined exposure levels, as shown. For example, a high exposure indicator may be included showing the number of exposures over a predefined high-pressure threshold, a medium exposure indicator may be included showing the number of exposures within a predefined medium-pressure range, and a low exposure indicator may be included showing the number of exposures within a predefined low-pressure range.

In some embodiments, the blast exposure report 602 includes a table 606 showing the number of exposures for each of a plurality of individual subjects such as subject 208). In some embodiments, only exposures exceeding a minimum threshold value will be counted into the number of exposures for each subject. In some embodiments, the blast exposure report 602 includes a table 608 showing the total number of exposures recorded for each day of the week. Accordingly, correlations may be made between exposure numbers and various scheduled active-duty or training operations. In some embodiments, the blast exposure report 602 includes a table 610 which shows an incident pressure for each blast exposure event of each user, as shown. For example, incident pressure data may be included in table 610 for a first user who experienced a total of three blast exposure events, a second user who experienced two blast exposure events and a third user who experienced three blast exposure events. In some embodiments, table 610 may only include data for users who have experienced a large number of blast exposure events or who have experienced blast exposure events with a high magnitude. Accordingly, blast exposure events may be characterized and the health and well-being of the users may be monitored.

In some embodiments, additional information may be included in the blast exposure report 602, such as, for example, an indication of a maximum incident overpressure. Further, in some embodiments, the blast exposure report 602 may include graphs of the raw pressure data or filtered data. Further still, in some embodiments, a spreadsheet including various parameters relating to the blast exposure may be included within the blast exposure report 602. In some embodiments, the blast exposure report 602 may be generated based on one or more stored output files from the blast exposure analysis.

Figure 7:
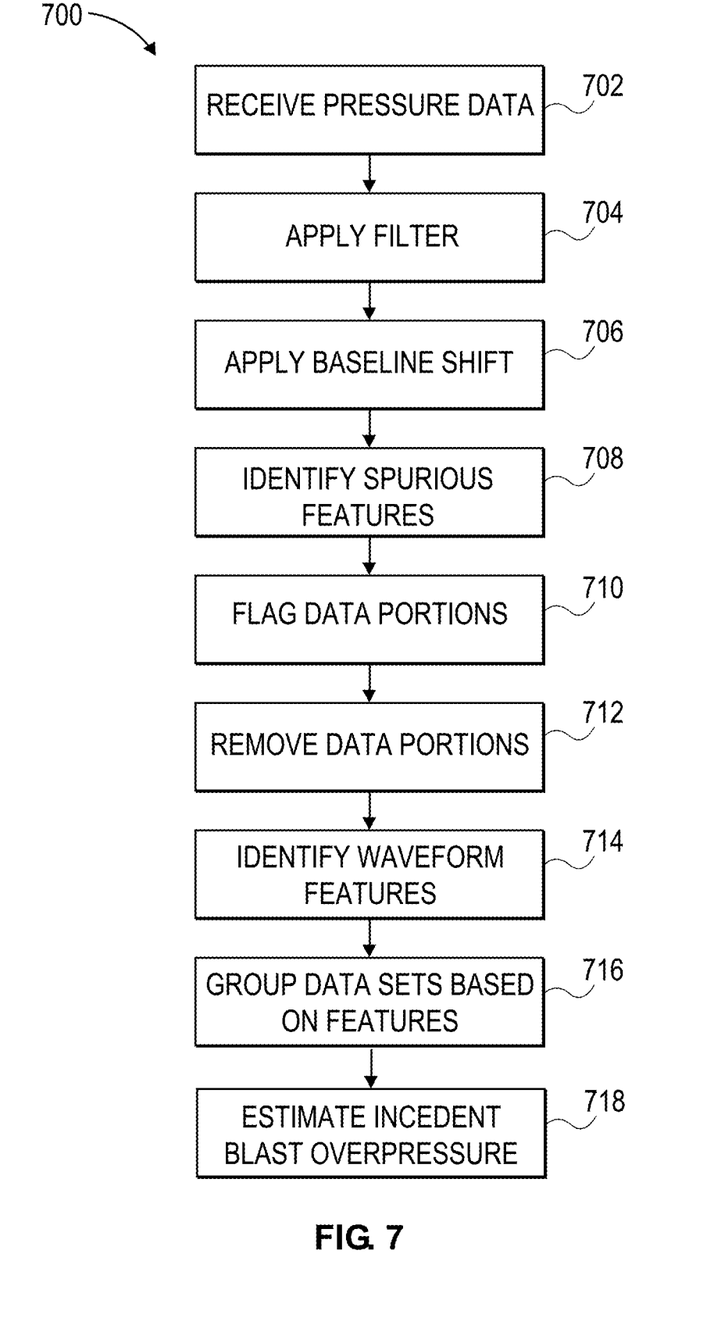
FIG. 7 depicts an exemplary method for analyzing blast exposure data relating to some embodiments of the invention.

Turning now to FIG. 7, an exemplary method 700 for analyzing blast exposure data is depicted relating to some embodiments of the invention. In some embodiments, the steps described herein may be performed using a plurality of different processors. In some embodiments, at least a portion of the steps may be performed using distinct processors associated with the signal processing chain 404 and the grouping analysis stage 418. For example, in some embodiments, a first portion of the steps described with respect to method 700 may be carried out on the signal processing chain 404 while a second portion of the steps are carried out on the grouping analysis stage 418, as shown in FIG. 4. In some embodiments, method 700 runs as an automated process in which any or all of the steps are performed automatically such that manual analysis of blast exposure data is not required.

Initially, at step 702, one or more sets of raw pressure data are received. In some embodiments, each set of pressure data may be received from a respective blast sensor of a plurality of blast sensors, such as head-mounted sensor 210, chest-mounted sensor 212, and shoulder-mounted sensor 214. Alternatively, the sensor data may be collected from the sensors to a central collection point prior to ingestion at step 702. In some embodiments, sensor data from a large number of subjects may be collected over a period of time and ingested substantially at once at step 702. For example, data for a platoon may be collected after a week-long exercise and analyzed in a batch processing process to determine aggregate and/or individualized blast exposure for the entire exercise, as described above with respect to FIG. 6.

At step 704, one or more filters are applied to the pressure data. In some embodiments, a low-pass filter such as a 4-pole Butterworth filter may be applied to the pressure data. Alternatively, a moving-average filter (such as, for example, an exponentially weighted moving average filter) can be employed to reduce transient noise. Broadly, any filter which can remove either noise or spurious transient data is contemplated for use at step 704. In some embodiments, the applied filter removes inconsequential noise and point spikes which would disrupt further steps of the analysis method. Accordingly, in some embodiments, the pressure data may be filtered before subsequent analysis steps.

At step 706, a baseline shift is applied to the pressure data to remove a bias from the pressure data. In some embodiments, a baseline shift value for the baseline shift is selected based on a beginning portion, an end portion, and a slope within the raw pressure data. Accordingly, in some such embodiments, the baseline shift may normalize the data based on an initial ambient pressure value which reduces bias from the blast sensor. In some embodiments, the baseline shift accounts for a gauge offset which may be unique to each blast sensor. For example, if the measured overpressure prior to the time of the shock wave arrival is not zero the baseline shift may reduce this offset such that the pressure data is zero before the time of shock wave arrival.

Next, at step 708, one or more spurious features are identified within either the raw pressure data or the filtered pressure data. In some embodiments, the spurious features comprise features which are deemed to be false-positive data or are otherwise not associated with typical pressures from blast exposure. In some embodiments, said spurious features may include any combination of a negative spike, a negative value prior to a pressure rise, a plateau of sustained increased overpressure, or a square wave. In some embodiments, spurious features may be identified based on a determination that the features relate to pressure values which are physically impossible or improbable.

At step 710, one or more data portions within the pressure data are flagged based at least in part on the identified spurious features. For example, a portion of the filtered pressure data may be flagged based on a determination that the portion of data comprises one or more spurious features which are related to spurious pressure values. In some embodiments, the corresponding portions of the data are automatically flagged for removal in response to identifying the spurious features. For example, a set of pressure data may be generated in response to dropping or striking a sensor. Such data will not correspond to actual blast data and should be excluded from further processing.

At step 712 at least one of the flagged data portions is removed from the set of filtered pressure data. In some embodiments, further analysis may be performed on each portion of flagged data to determine the likelihood that the data relates to a real pressure value or otherwise correspond to an actual blast event. If it is determined that the flagged data does not corresponds to a blast event and/or includes a false positive value, the portion of flagged data is removed to prevent mischaracterization or other misanalysis of the blast exposure data.

At step 714 one or more waveform features are identified within the pressure data. In some embodiments, the waveform features may be identified using various signal processing techniques including applying a Savitzky-Golay filter or an additional low pass filter, integrating the pressure data with respect to time, or differentiating the pressure data with respect to time. Further, various characteristics of the pressure data may be used to identify said waveform features such as maxima and minima, and pressure changes (shown by the slope of the time series of pressure data). In some embodiments, a polynomial or non-polynomial fit may be applied to the pressure data before waveform features are identified. For example, embodiments are contemplated in which a Friedlander fit is applied to the pressure data based on the Friedlander equation. In some embodiments, the pressure data may be further scaled after the fit to improve the accuracy. In some embodiments, the waveform features identified include peak waveforms determined to be associated with a blast wave. For example, each peak waveform may be characterized by identifying a sharp pressure rise to a peak pressure value followed by a relatively gradual decrease to a zero-pressure value, as described above.

At step 716 two or more data sets of pressure data including any combination of the raw pressure data and the filtered pressure data, as well as various characteristics of the pressure data, are grouped into a blast event data grouping based at least in part on the one or more identified waveform features. For example, in some embodiments, data sets may be grouped together based on a determination that they include similar identified waveform features. In some embodiments, the grouping determination may be carried out at the grouping analysis stage 418. In some embodiments, the grouping may be applied to group sensor data collected for a given blast event. For example, respective data sets from the head-mounted sensor 210, the chest-mounted sensor 212, and the shoulder-mounted sensor 214 of a subject 208 may be grouped together based on a determination that the data sets relate to the same blast event. In some embodiments, the grouping may be based further on timestamps within each data set, as described above. For example, each data set may include three blast events with corresponding pressure peaks at particular time intervals. After correcting for clock skew and drift between the sensors, head, chest and shoulder blast sensors for the same subject for that three-blast-event interval may be grouped together for later analysis, as described below.

At step 718 an incident blast overpressure is estimated based on the data sets within a given blast event grouping. In some embodiments, the incident blast overpressure for a blast event may be determined by considering pressures from each data set in the blast event grouping. Further, in some embodiments, an incident peak overpressure may be determined based on the grouped pressure data for a blast event. Further still, in some embodiments, an incident peak overpressure impulse or total overpressure impulse may be determined. Accordingly, the standardized incident values may be used to characterize and compare blast events and to determine the severity of individual blast exposures. In some embodiments, the estimated incident values may be included within an output file and stored.

In some embodiments, cube-root scaling may be used along with the TNT blast standard to determine a standardized overpressure and impulse for the incident. For example, in some embodiments, a radius at which the measured peak overpressure would occur for a 1-pound TNT charge is determined using the TNT standard. Next, an overpressure positive phase duration and overpressure impulse for a 1-pound TNT charge at the determined radius are determined. Respective yields may be determined by taking the cubes of each of the measured positive phase duration and the overpressure impulse. An approximate yield is then determined as the average of the two respective yields from the phase duration and the impulse. Finally, the approximated yield is used to determine a standardized incident blast overpressure and impulse using cube root scaling from the 1-pound TNT standard.

$$P(t) = (POP)\left(E^{\left(-\frac{t}{PPD}\right)}\right)\left(1 - \frac{t}{PPD}\right) \quad \text{Equation 1}$$

$$OPI = (POP)\left(\frac{PPD}{e}\right) \quad \text{Equation 2}$$

Alternatively, in some embodiments, the incident overpressure and impulse may be determined using the Friedlander equation (Equation 1) as shown above, which leads to a more accurate approximation. The Friedlander equation determines overpressure as a function of time where t is the time after the shock arrival, POP is the peak overpressure, PPD is the positive phase duration, and e is the base of the natural logarithms. Further, Equation 2, shown above, may be used to determine the overpressure impulse OPI, where similarly to Equation 1, POP is the peak overpressure, PPD is the positive phase duration. Here, the waveform from each sensor is examined and a best fit for a Friedlander waveform is determined based on the peak overpressure and the positive phase duration. Next, the fits for each waveform are used to estimate the incident waveform using the TNT blast standard. Accordingly, the incident blast overpressure and impulse may be determined without considering the locations of each of the blast sensors. In some embodiments, the Friedlander fit approach may be used to determine the incident parameters of the blast event independently of the position and orientation of the blast sensors. Accordingly, embodiments are contemplated in which information indicative of the position and orientation of the blast sensors is not considered and does not need to be stored or processed.

Further, in some embodiments, the Friedlander fit approach for determining incident blast parameters may be adapted to double peaked waveforms. For example, in some embodiments, double peaked waveforms may be caused by shock reflections from a blast wave. Here, a first pressure peak may be immediately followed by a second pressure peak such that the first peak does not return to a zero-value overpressure before the second peak starts. Accordingly, in such embodiments, a Friedlander fit is determined for each of the first waveform peak and the second waveform peak individually such that incident blast parameters may be determined for each peak. In some embodiments, the Friedlander fit may be used to estimate the positive phase duration for the first pressure peak even though the overpressure does not return to zero. It should be understood that the Friedlander fit approach may be adapted for any number of peaks within a set of pressure data.

In some embodiments, the estimated incident blast parameters may be stored, for example, within the data store 316 within the output file 314, as shown in FIG. 3. In some embodiments, the incident blast parameters may be recorded into a spreadsheet along with additional information such as the raw pressure data, filtered pressure data and various metadata such as a user identifier. Accordingly, the incident blast parameters may be used to characterize blast exposures which may inform medical records and further develop safe training practices involving blast exposure. In some embodiments, the determined incident blast parameters may be used to detect traumatic brain injuries before cumulative exposure leads to adverse medical outcomes. Accordingly, in some embodiments, the incident blast parameters may be included within the blast exposure report 602, as shown in FIG. 6, to review the magnitude of various blast events and their impact on individuals.

In some embodiments, the blast exposure analysis described herein is effective for a wide range of blast exposure magnitudes. For example, in some embodiments, the analysis may accurately determine an incident blast overpressure and impulse for a charge of less than 1 gram. Alternatively, the analysis may also be employed for charges with larger magnitudes and virtually any type of explosive or explosive-like device which generates a blast wave. For example, blast parameters may be determined for .50 caliber rifles, canons, breacher charges, land mines, or battlefield encounters, as well as various other military training and artillery operations. In some embodiments, the blast exposure analysis may be used in other areas such as for law enforcement personnel either during training operations or during active law enforcement situations.

In some embodiments, the incident blast parameters provide a standardized metric for comparing blast exposures from various different weapon systems and other types of blast exposures. In some embodiments, the blast exposure analysis may be used to identify a blast source for a blast event based on one or more predefined blast signatures. For example, various types of blast sources including weapons and explosives may be associated with a uniquely identifiable blast signature. Accordingly, embodiments are contemplated in which the specific type of blast source may be identified based on the determined blast parameters of a given blast event such as the incident peak overpressure, the positive phase duration and the incident overpressure impulse, as well as other parameters determined through the analysis. For example, in some embodiments, any of the waveform features identified at step 714 may be used to determine a blast signature to which the blast event correlates and thereby identify the source of the blast.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A method of analyzing blast exposure data, the method comprising:
receiving a set of blast exposure data comprising pressure data over time from at least one blast sensor;
determining impulse data based on the set of blast exposure data;
identifying at least one instance of false positive data within the set of blast exposure data;
classifying the at least one instance of false positive data from the set of blast exposure data;
accepting a remaining portion of the set of blast exposure data as real blast data that does not include the at least one instance of false positive data; and
identifying one or more blast related features from the set of blast exposure data.

2. The method of claim 1, further comprising:
training a machine learning algorithm based on a set of historical blast exposure data comprising blast data from a plurality of blast sources.

3. The method of claim 2, further comprising:
identifying a type of weapon associated with a blast source of the set of blast exposure data based on the one or more blast related features from the set of blast exposure data.

4. The method of claim 1, wherein the set of blast exposure data is received from one or more body-mounted blast sensors.

5. The method of claim 1, further comprising:
grouping two or more portions of the set of blast exposure data into a blast event data grouping based on the one or more blast related features.

6. The method of claim 1, further comprising:
estimating an incident overpressure based on the set of blast exposure data.

7. The method of claim 1, further comprising:
determining that the at least one instance of false positive data is associated with an electrical interference class; and
removing the at least one instance of false positive data associated with the electrical interference class from the set of blast exposure data.

8. One or more non-transitory computer-readable media storing computer-executable instructions that, when executed by at least one processor, perform a method for analyzing blast exposure data, the method comprising:
receiving a set of blast exposure data comprising pressure data over time from at least one blast sensor;
determining impulse data based on the set of blast exposure data;
identifying, using a machine learning algorithm, one or more instances of false positive data within the set of blast exposure data;
removing the one or more instances of false positive data from the set of blast exposure data;
accepting a remaining portion of the set of blast exposure data as real blast data that does not include false positive data and corresponds to a blast event; and
identifying one or more blast related features from the set of blast exposure data.

9. The one or more non-transitory computer-readable media of claim 8, the method further comprising:
training the machine learning algorithm to distinguish between real blast exposure data and false positive data, wherein the machine learning algorithm trained based on a set of historical blast exposure data comprising blast data from a plurality of blast sources.

10. The one or more non-transitory computer-readable media of claim 8, the method further comprising:
analyzing the remaining portion of the set of blast exposure data to identify a maximum incident overpressure for the blast event.

11. The one or more non-transitory computer-readable media of claim 8, the method further comprising:
analyzing the remaining portion of the set of blast exposure data to identify an incident peak overpressure impulse for the blast event.

12. The one or more non-transitory computer-readable media of claim 8, the method further comprising:
   analyzing the remaining portion of the set of blast exposure data to identify a positive phase duration for the blast event.

13. The one or more non-transitory computer-readable media of claim 8, the method further comprising:
   analyzing the remaining portion of the set of blast exposure data to identify an impulse for the blast event.

14. The one or more non-transitory computer-readable media of claim 8, the method further comprising:
   determining, based on the set of blast exposure data, shock wave arrival time for the blast event.

15. A system for analyzing blast exposure data, the system comprising:
   one or more body-mounted sensors that capture a set of blast exposure data, the one or more body-mounted sensors configured to be worn by a subject;
   at least one processor; and
   one or more non-transitory computer-readable media storing computer-executable instructions that, when executed by the at least one processor, perform a method of analyzing the blast exposure data, the method comprising:
      receiving the set of blast exposure data from the one or more body-mounted sensors;
      determining impulse data based on the set of blast exposure data;
      identifying, using a machine learning algorithm, one or more instances of false positive data within the set of blast exposure data;
      removing the one or more instances of false positive data from the set of blast exposure data;
      accepting a remaining portion of the set of blast exposure data as real blast data that does not include false positive data; and
      identifying one or more blast related features from the set of blast exposure data.

16. The system of claim 15, further comprising:
   a removable storage device configured to be coupled to the one or more body-mounted sensors and to store the set of blast exposure data.

17. The system of claim 15, wherein the one or more body-mounted sensors are positioned with distinct orientations.

18. The system of claim 15, the method further comprising:
   identifying, using the machine learning algorithm, a type of weapon associated with a blast source of the set of blast exposure data based on the one or more blast related features from the set of blast exposure data.

19. The system of claim 15, wherein the set of blast exposure data comprises a plurality of pressure traces captured by the one or more body-mounted sensors.

20. The system of claim 15, wherein the one or more instances of false positive data are removed from the set of blast exposure data prior to further analyzing the set of blast exposure data.

* * * * *